(12) United States Patent
Goodrick et al.

(10) Patent No.: US 10,117,441 B2
(45) Date of Patent: Nov. 6, 2018

(54) FISH PROCESSING DEVICE

(71) Applicant: Nordischer Maschinenbau Rud. Baader GmbH + Co. KG, Lubeck (DE)

(72) Inventors: Geoffrey Bruce Goodrick, Sheldon (AU); Liam Alexander Goodrick, Sheldon (AU)

(73) Assignee: Nordischer Maschinenbau Rud. Baader GmbH + Co. KG, Lubeck (DE)

( * ) Notice: Subject to any disclaimer, the term of this patent is extended or adjusted under 35 U.S.C. 154(b) by 208 days.

(21) Appl. No.: 14/769,065

(22) PCT Filed: Feb. 20, 2014

(86) PCT No.: PCT/EP2014/053367
§ 371 (c)(1),
(2) Date: Aug. 19, 2015

(87) PCT Pub. No.: WO2014/128230
PCT Pub. Date: Aug. 28, 2014

(65) Prior Publication Data
US 2016/0000051 A1    Jan. 7, 2016

(30) Foreign Application Priority Data

Feb. 20, 2013    (AU) .............................. 2013900621

(51) Int. Cl.
*A01K 61/00*    (2017.01)
*A22C 25/08*    (2006.01)
(Continued)

(52) U.S. Cl.
CPC .............. *A22C 25/08* (2013.01); *A01K 61/90* (2017.01); *A22B 1/00* (2013.01); *A22C 25/12* (2013.01); *Y02A 40/81* (2018.01)

(58) Field of Classification Search
CPC ........ A01K 61/90; A01K 61/95; A01K 61/00; A01K 61/10; A22C 25/08; A22C 25/00; A22C 25/04; A22C 25/12; A22B 1/00
See application file for complete search history.

(56) References Cited

U.S. PATENT DOCUMENTS 3,800,363 A * 4/1974 Lapeyre ................. A22C 25/18
452/158
4,051,952 A * 10/1977 Hauptmann ........... A22C 25/04
198/415

(Continued)

FOREIGN PATENT DOCUMENTS

CL    201000122    2/2010
CN    1033732 A    7/1989
(Continued)

OTHER PUBLICATIONS

International Search Report and Written Opinion dated May 22, 2014 from International Patent Application No. PCT/EP2014/053367 filed Feb. 20, 2014.

(Continued)

*Primary Examiner* — Kathleen I Alker
(74) *Attorney, Agent, or Firm* — Sunstone IP

(57) ABSTRACT

A fish processing device and method of use, the device including: a channel; a sensor located within or adjacent to the channel; a barrier, the barrier to assist in preventing a fish passing through the channel; and a control system, wherein the control system controls the barrier in response to an output of the sensor. The method including the steps of: detecting that a fish is incorrectly orientated in a channel; and controlling a barrier to assist in preventing the fish from passing through the channel.

12 Claims, 3 Drawing Sheets

(51) Int. Cl.
*A22C 25/12* (2006.01)
*A22B 1/00* (2006.01)
*A01K 61/90* (2017.01)

(56) References Cited

U.S. PATENT DOCUMENTS

| | | | | |
|---|---|---|---|---|
| 4,244,475 A | * | 1/1981 | Green | A22C 25/04 |
| | | | | 209/588 |
| 4,601,083 A | | 7/1986 | Shoji et al. | |
| 4,743,742 A | * | 5/1988 | Espedalen | A01K 61/90 |
| | | | | 119/215 |
| 5,103,767 A | | 4/1992 | Haugland et al. | |
| 5,115,903 A | * | 5/1992 | Leander | A22C 25/12 |
| | | | | 198/400 |
| 5,816,196 A | * | 10/1998 | Webster | A01K 61/90 |
| | | | | 119/228 |
| 5,937,791 A | * | 8/1999 | Baugher | A01K 79/02 |
| | | | | 119/200 |
| 6,035,575 A | * | 3/2000 | Hilty | A01K 69/06 |
| | | | | 43/100 |
| 6,145,476 A | | 11/2000 | Tempel | |
| 6,712,555 B1 | * | 3/2004 | Truebe | A01K 61/00 |
| | | | | 119/219 |
| 6,880,485 B2 | * | 4/2005 | Massey | A01K 61/90 |
| | | | | 119/216 |
| 7,220,177 B2 | | 5/2007 | King et al. | |
| 7,575,508 B2 | | 8/2009 | Goodrick | |
| 8,044,337 B2 | * | 10/2011 | Duszynski | G06M 1/101 |
| | | | | 250/221 |
| 9,295,227 B2 | * | 3/2016 | Skvorc, II | A01K 11/008 |
| 2013/0139761 A1 | * | 6/2013 | Nedwell | A01M 29/10 |
| | | | | 119/219 |
| 2017/0238512 A1 | * | 8/2017 | Hilmarsson | A01K 61/90 |
| 2017/0241892 A1 | * | 8/2017 | Brubacher | G01N 15/1429 |

FOREIGN PATENT DOCUMENTS

| | | | |
|---|---|---|---|
| EP | 0311879 A1 | 4/1989 | |
| EP | 1908353 B1 | 3/2010 | |
| GB | 2467838 A | 8/2010 | |
| JP | 03187342 A * | 8/1991 | A22C 25/12 |
| WO | 99/46997 A1 | 9/1999 | |
| WO | 2010/036122 A1 | 4/2010 | |

OTHER PUBLICATIONS

International Preliminary Report on Patentability dated Aug. 25, 2015 from International Patent Application No. PCT/EP2014/053367 filed Feb. 20, 2014.

* cited by examiner

FISH PROCESSING DEVICE

FIELD OF THE INVENTION

The invention relates to a fish processing device and method of use. In particular, the invention relates, but is not limited, to a fish processing device in a fish process station.

BACKGROUND TO THE INVENTION

Reference to background art herein is not to be construed as an admission that such art constitutes common general knowledge in Australia or elsewhere.

The harvesting of fish from their natural environment or containment area is a complex process. One popular manner in which fish are harvested is to surround all of the fish with a net and then draw in the net, in a process often referred to as seining. Fish are then transferred from the net into a harvest system distribution tank. As discussed in U.S. Pat. No. 7,220,177, once the fish are in the harvest distribution tank, a water current is often used to entice the fish towards channels leading them to a stunning and/or bleeding device.

Inevitably some fish are delivered to the distribution tank in such a stressed, exhausted or disoriented state that they are unable to immediately regain their correct orientation. As such, they will enter the channels of the distribution tank and process station upside down (belly up).

This incorrect presentation to the process station can cause a number of problems. For example, if the process station includes a stunning machine, the fish will be ineffectively stunned on their underside, in the vicinity of their jaw or gills. Accordingly, this leads to further inspection and correction actions, increasing the cost of production. Furthermore, the quality of the fish may be downgraded with a subsequent loss of sales value.

In addition, if the stunning machine is fitted with a bleeding device, this will also result in a cut to the incorrect location of the fish (usually the head region), which may result in inadequate bleeding as well as an unsightly gash on the head of the fish. This will also cause the quality of the fish to be downgraded with a subsequent loss of sales value.

Alternatively, the process station may provide non-life terminating activities such as health treatments or grading. If however, the fish is presented in the incorrect orientation during these processes, this again leads to further inspection and correction actions increasing the cost of production.

Most stressed, exhausted or disoriented fish will recover and swim in the correct orientation given sufficient time.

It is an object of the invention to overcome or ameliorate one or more of the disadvantages or problems described above, or at least provide a useful alternative.

Other preferred objects of the present invention will become apparent from the following description.

SUMMARY OF INVENTION

In one form, although not necessarily the only or broadest form, the invention resides in a fish processing device, the device including:
a channel;
a sensor located within or adjacent to the channel;
a barrier, the barrier to assist in preventing a fish passing through the channel; and
a control system, wherein the control system controls the barrier in response to an output of the sensor.

The fish processing device according to the invention is to be understood as a device to induce an action with the fish, namely to stop the fish from passing through the channel as long as the fish is in an incorrect orientation (in particular upside down/belly up) for further processing at a station downstream from the channel processing device.

The channel is designed to accommodate or to guide the fish within water, in particular a water current. For example, the channel is designed and adapted to receive a counter water current flowing in a counter direction to a swimming direction of the fish. The channel is also designed to be supplied alternatively with a water current being in the same direction as a swimming direction of the fish. The choice of the direction of the water current depends on the fish to be processed. In any case, the fish are enticed to swim through the channel, in particular by a water current. The barrier is to be understood as a device which sets or unsets at least one barrier element. This setting is controlled by the control system. With the unset or removed state or position of one or barrier elements, in particular with the position of a barrier panel, the state of a light and/or of a jet of air, the fish is allowed to pass through the channel.

Preferably, the channel is substantially watertight. Preferably, the fish are enticed to swim through the channel by a water current. Optionally, the channel is enclosed, forming an internal passage.

Preferably, the sensor is a visual sensor. The visual sensor may advantageously be designed in that it detects different colours between a dorsal surface and a ventral surface of the fish. In addition or alternatively the visual sensor may be designed in that it detects the different shape between the dorsal surface and ventral surface of the fish. Preferably, the sensor is at the top of the channel.

Preferably, the barrier is a gate. Preferably, the gate includes a panel and an actuator. The general arrangement of the gate or the panel or another gate element is in that, in one position or state, it engages the fish swimming in or carried with the water so that the fish is stopped from passing through the channel.

According to a particular design, the panel is moveable from an open position to a closed position by the actuator. The closed position is to be understood as the barrier state which assists in preventing a fish passing through the channel. According to an embodiment, the panel is pivotable about a point in order to move it from the open position to the closed position.

According to an embodiment, the barrier is formed by or includes a device generating a jet of air and/or a light source to deter the fish. The barrier is a jet of air or a light source to deter the fish. The barrier may include the gate, the jet of air and/or the light source.

According to an embodiment, the control system is designed to control the barrier to assist in preventing the fish passing through the channel when the output of the sensor indicates the fish is incorrectly orientated. The control system may further include an alarm to alert an operator if the fish remains incorrectly orientated in the channel. A preferred control configuration or design of control of the control system is in that the orientation of the fish is detected incorrectly when the fish passes through the channel upside down. Typically, the fish is orientated incorrectly when the fish passes through the channel upside down.

A further preferred configuration or design of the control system is obtained in that the control system will remove the barrier if the output of the sensor indicates that the fish is reorientated correctly or no longer present. Removing the barrier means that, controlled by the control system, the barrier device, i.e. the barrier, namely at least one barrier element, for example a light source, a jet of air, a gate and/or a panel, takes or assumes a state and/or a position which does not prevent a fish passing through the channel.

Preferably, the fish processing device is used in a fish process station. Optionally, the fish processing device according to the invention may be used in non life terminating activities such as treating the health of the fish.

In another form the invention resides in a method for processing a fish, the method including the steps of:
  detecting that a fish is incorrectly orientated in a channel; and
  controlling a barrier to assist in preventing the fish from passing through the channel.

According to an embodiment of the invention, the method is characterized in that said steps are carried out by the fish processing device according to the invention.

Preferably, the fish will correctly reorientate themselves whilst they are prevented from passing through the channel by the barrier.

Preferably, if the fish remains incorrectly orientated, the method further includes alarming an operator to reorientate or remove the fish.

Even more preferably, the method further includes removing the barrier when the fish is correctly reorientated or removed from the channel.

Typically, the fish is orientated incorrectly when the fish passes through the channel upside down.

Further features and advantages of the present invention will become apparent from the following detailed description.

The description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

BRIEF DESCRIPTION OF THE DRAWINGS

By way of example only, preferred embodiments of the invention will be described more fully hereinafter with reference to the accompanying figures, wherein.

DETAILED DESCRIPTION OF THE DRAWINGS

Figure 1:
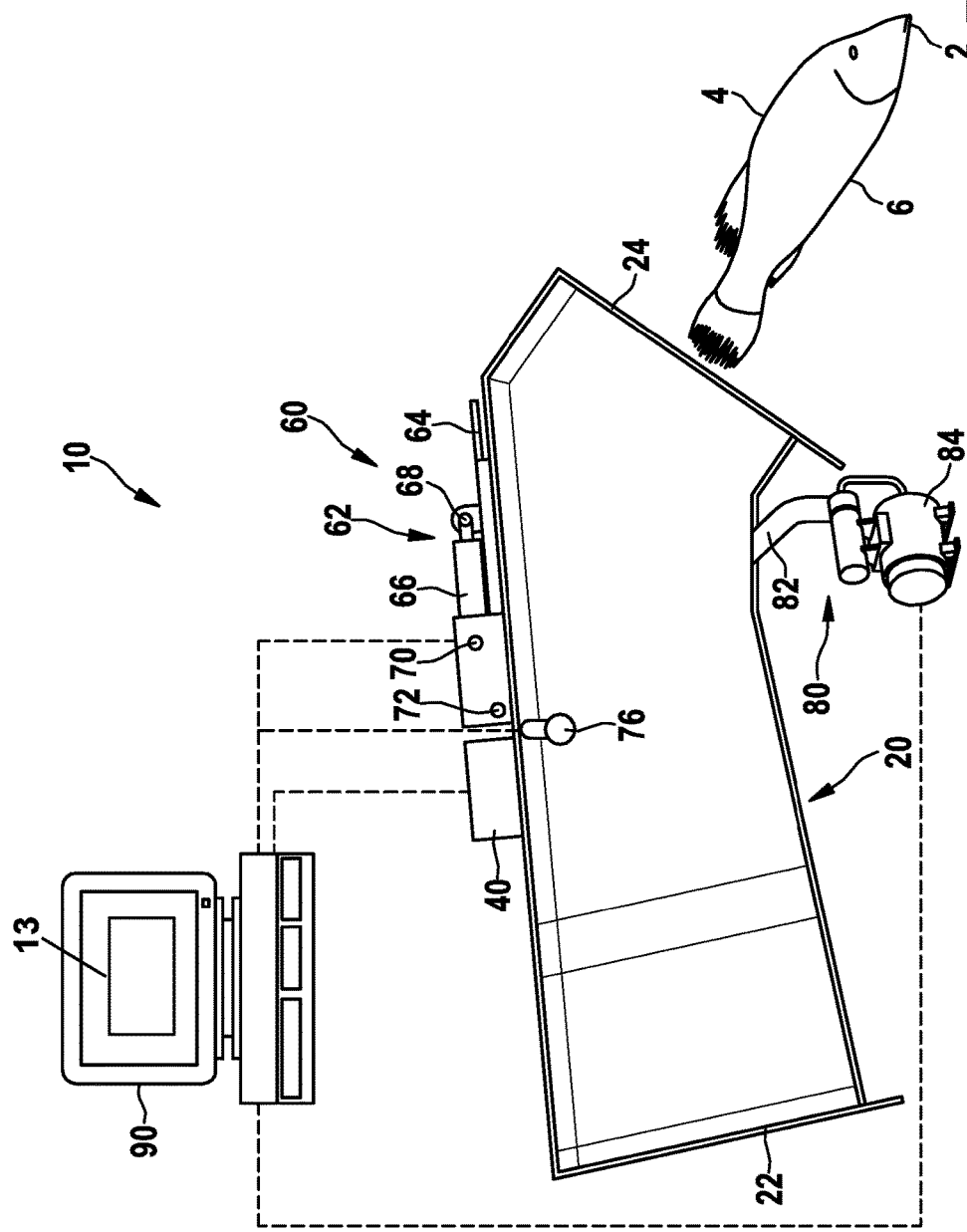
FIG. 1 illustrates a side sectional view of a fish processing device according to an embodiment of the invention.
Figure 2:
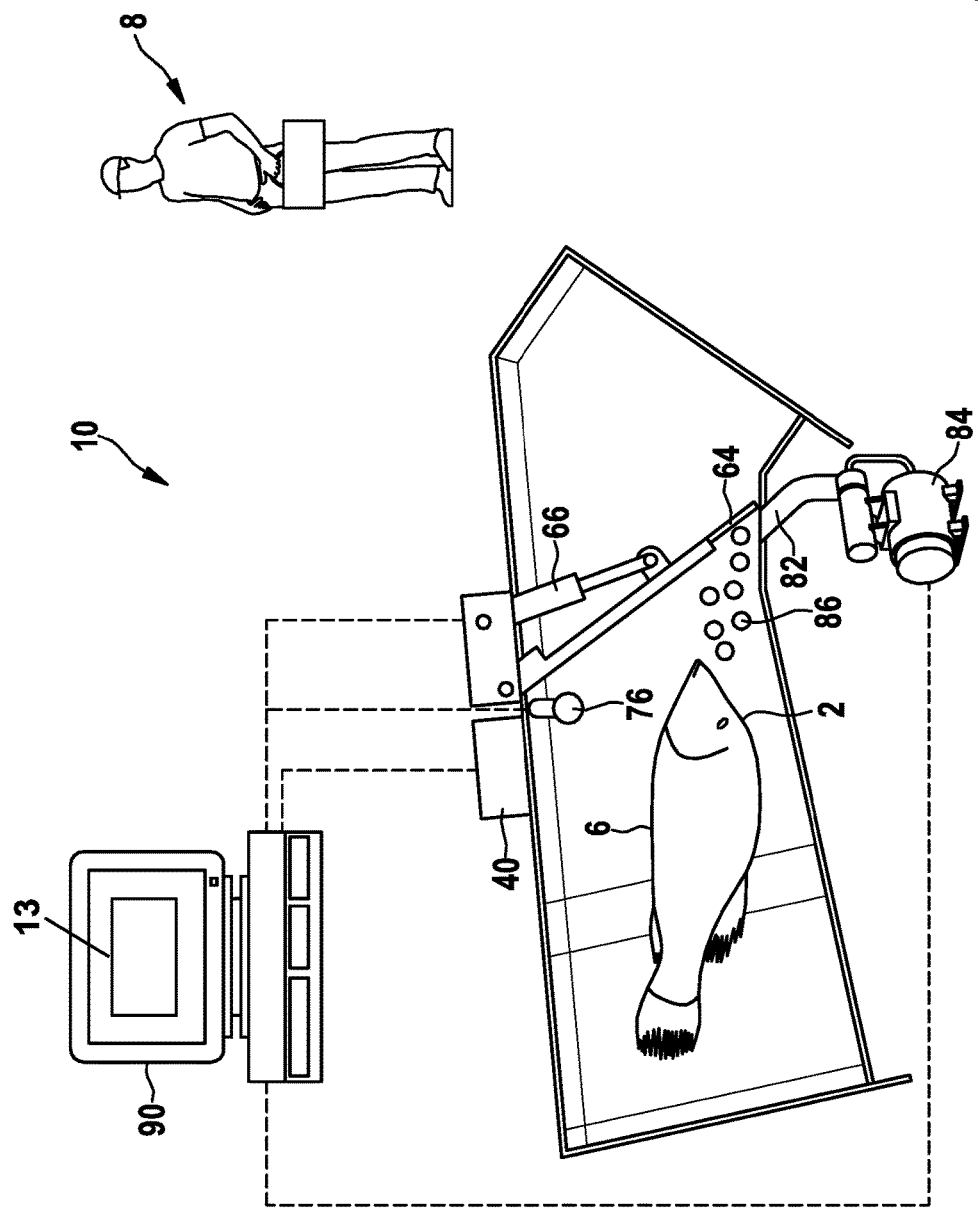
FIG. 2 illustrates the side section view in FIG. 1 with the fish processing device being controlled.

FIGS. 1 to 2 show a fish orientation device 10 according to an embodiment of the invention. The fish orientation device 10 includes a channel 20, a sensor 40, a barrier 60 and a control system 90.

The channel 20 has an entry 22 and an exit 24. The exit 24 is slightly raised with respect to the entry 22. The channel 20 is substantially watertight. A water current flows through the channel 20 enticing a fish 2 to pass through the channel 20. The direction of the water current to entice the fish 2 to pass through the channel 20 may be dependent on the species of fish 2. For example, a counter water current may flow in a counter direction to a swimming direction of the fish 2. Alternatively, the water current may be in the same direction to a swimming direction of the fish 2. The internal passage of channel 20 is substantially rectangular. However, it would be appreciated by a person skilled in the art that the internal passage of channel 20 may take a variety of shapes.

The sensor 40 is at the top of channel 20 in this embodiment. The sensor 40 senses information from the internal passage of the channel 20 and relays this information as an output. The sensor 40 detects differences in colours on the fish 2. As an alternative, the sensor 40 can detect the different shapes of the fish 2. The sensor 40 is located before the barrier 60.

The barrier 60 includes a gate 62, a light source 76 and an air jet 80. The gate 62, light source 76 and air jet 80 are used to assist in preventing the fish 2 from passing through the channel 20. The fish 2 are normally repelled by the light source 76 and the air jet 80. The gate 62 is located at the top of channel 20. The gate 62 includes a panel 64 and an actuator 66. The panel 64 and the actuator 66 are pivotally coupled at point 68. The panel 64 is also pivotally coupled at point 72. The actuator 66 is pivotally coupled at point 70. The light source 76 is located at the top of the channel 20. Alternatively, the light source 76 may be located in a number of locations including at the bottom of channel 20. Preferably, the light source is infrared, white, or coloured LED. Other waterproof sources of light may also be used. The air jet 80 includes an air nozzle 82 and a compressed air supply 84. The air nozzle 82 is located at the bottom of the channel 20.

The controller 90 is in communication with the sensor 40 and the barrier 60. Depending on the output of sensor 40, the controller 90 controls the barrier 60 to assist in preventing the fish 2 from passing through the channel 20. In this embodiment, the controller will control the barrier to assist in preventing the fish 2 from passing through the channel 20 when the fish 2 is in the incorrect orientation. The fish 2 is in the incorrect orientation when it swims upside down through the channel 20. In this incorrect orientation, a ventral surface 6 of the fish 2 passes by the sensor 40 instead of a dorsal surface 4 of the fish 2. The ventral surface 6 of the fish 2 can be differentiated from the dorsal surface 4 of the fish 2 by colour and shape.

FIG. 2 illustrates the controller 90 controlling the barrier 60. The fish 2 has attempted to pass through the channel 20 swimming upside down. The fish 2 has a darker dorsal surface 4 compared to its ventral surface 6. Accordingly, when the lighter colour of the ventral surface 6 has been detected by the sensor 40, the controller 90 has controlled the barrier 60 to stop the fish 2 from passing through the channel 20. That is, the controller 90 has controlled a shaft of the actuator 66 to move forward. As the shaft of the actuator 66 moves forward, panel 64 pivots around point 72. The panel 64 pivots from an open position, shown in FIG. 1, to a closed position as shown in FIG. 2. In the closed position, the panel 64 blocks the fish 2 from passing through channel 20. In the open position, the fish 2 can pass through the channel 20.

In FIG. 2, the controller 90 has also controlled and turned on the light 76 to assist in preventing the fish 2 from passing through the channel 20. Similarly, the controller 90 has controlled and turned on the compressed air supply 84. The compressed air supply 84 in turn blows air bubbles 86 from the air nozzle 82, towards the fish 2. The bubbles deter the fish 2 from passing through the channel 20.

To remove the barrier 60, it will be appreciated by a person skilled in the art, that the controller 90 will retract the shaft of the actuator 66 moving the panel 64 to the open position, turn off the light 76 and stop the compressed air supply 84.

The controller 90 will not remove the barrier 60 until the output of the sensor 40 indicates that the ventral surface 6 of the fish 2 is no longer detected. The ventral surface 6 of the fish 2 will no longer be detected if the fish 2 withdraws towards the entry 22 of the channel 20, where the sensor 40 can no longer detect the fish 2. Alternatively, the ventral surface 6 of the fish 2 will no longer be detected if the fish 2 reorientates itself correctly or if the fish 2 is removed from the channel 20. Typically, the fish 2 will withdraw towards the entry 22 or correctly reorientate itself whilst it is stopped by the barrier 60. If the fish 2 remains in the incorrect orientation however, the controller 90 will alert an operator 8 via alarm 13. The operator 8 will then correctly reorientate the fish 2 or remove it from the channel 20. The controller 90 may also include a counter. The counter records the number of times further fish are detected in an incorrect orientation in the fish processing device 10.

Figure 3:
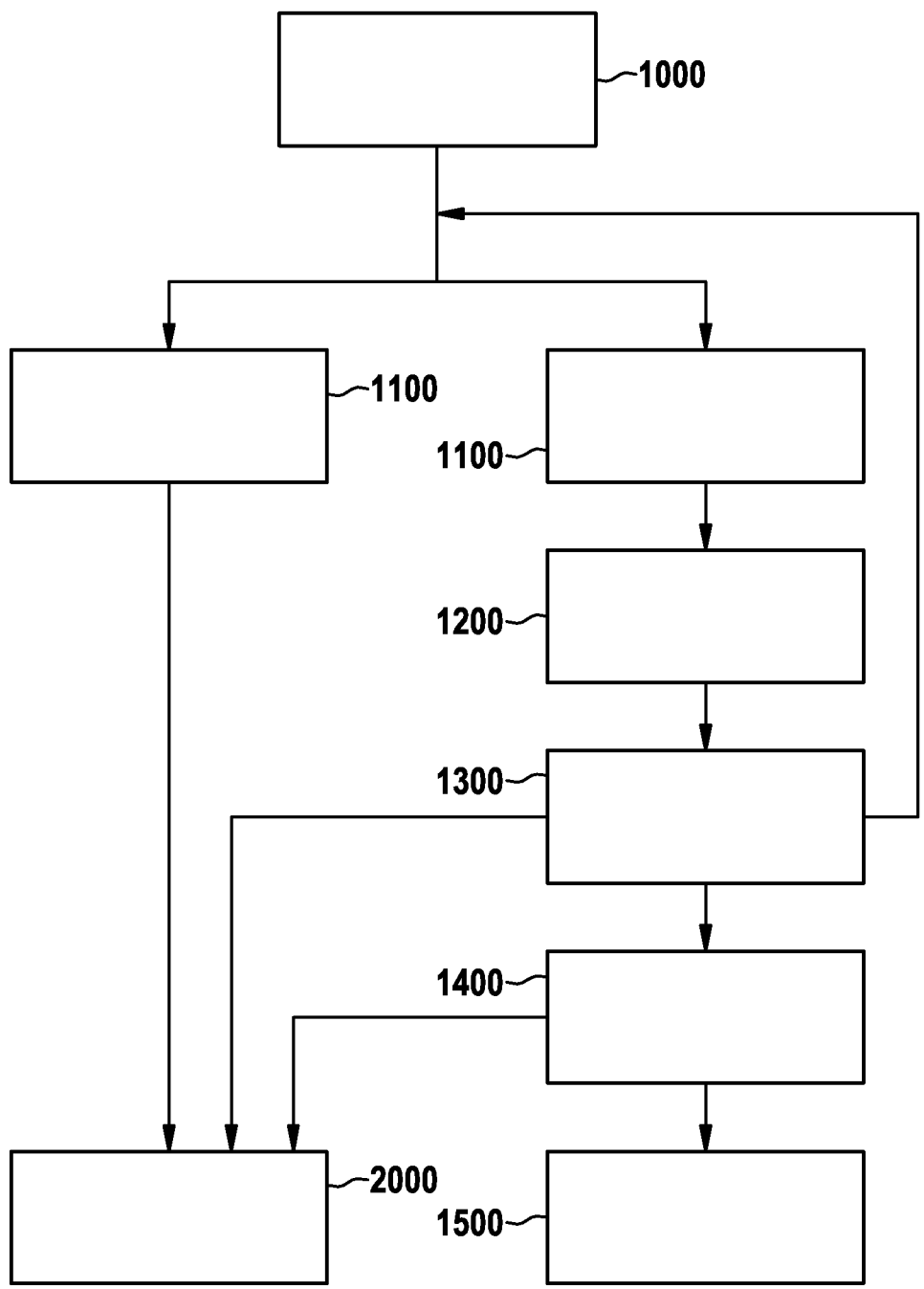
FIG. 3 illustrates a flow diagram of a method for processing a fish, according to an embodiment of the invention.

FIG. 3 illustrates a flow diagram detailing a method of reorientating a fish according to an aspect of the invention with reference to FIG. 1.

At step 1000, the fish 2 proceeds through the entry 22 of channel 20. At step 1100, the fish 2 enters a sensor area of the sensor 40. If the fish 2 is correctly orientated, the fish 2 proceeds to the exit 24 of the channel 20 at step 2000. If however, the fish 2 is detected to be incorrectly orientated at step 1100, the barrier 60 is controlled to stop the fish 2 passing through the channel 20 at step 1200. How the barrier 60 is controlled to stop the fish 2 passing through the channel 20 is previously described above. If the fish 2 reorientates itself correctly or withdraws from the sensor area such that it can no longer be detected, at step 1300, the barrier 60 will be removed, as previously described above. After step 1300, if the fish 2 has reorientated itself correctly, the fish 2 proceeds to the exit 24 of the channel 20 at step 2000. If the fish 2 has withdrawn from the sensor area, the fish 2 returns to step 1100. At step 1100, if the fish is correctly orientated, the fish 2 proceeds to the exit 24 of the channel 20 at step 2000. However, if the fish is again incorrectly orientated, the barrier will again stop the fish 2 passing through the channel 20 at step 1200.

If the fish 2 remains incorrectly orientated, at step 1400, the operator 8 will correctly reorientate the fish 2 or remove it from the channel 20 at step 1500. If fish 2 remains correctly orientated after being reorientated by the operator 8, the fish 2 proceeds to the exit 24 of the channel 20 at step 2000.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The invention claimed is:

1. A fish processing device, the device including:
a channel adapted to allow a fish to move through the channel, wherein the channel is adapted to allow a water current to pass through the channel thereby encouraging the fish to move through the channel;
a barrier located in the channel, wherein the barrier has an open position and a closed position;
a sensor associated with the channel; and
a control system in communication with the sensor and the barrier, wherein the control system and the sensor are designed to detect a first or second orientation of the fish, wherein the fish is in the first orientation when a dorsal surface of the fish faces upward and wherein the fish is in the second orientation when the dorsal surface of the fish faces downward;
wherein when the fish is in the first orientation the barrier is adapted to allow the fish to pass through the channel, and wherein when the fish is in the second orientation the barrier is adapted to assist in deterring the fish from passing through the channel by engaging the fish, and
wherein the control system is adapted to control the barrier in response to an output of the sensor, wherein the control system moves the barrier toward the open position when an output of the sensor senses that the fish is in the first orientation in the channel.

2. The fish processing device according to claim 1, wherein the channel is designed in that the fish are enticed to swim through the channel by a water current.

3. The fish processing device according to claim 1, wherein the channel is enclosed forming an internal passage.

4. The fish processing device according to claim 1, wherein the sensor is a visual sensor.

5. The fish processing device according to claim 4, wherein the visual sensor is adapted to detect the different colors between the dorsal surface and a ventral surface of the fish.

6. The fish processing device according to claim 4, wherein the visual sensor is adapted to detect the different shape between the dorsal surface and a ventral surface of the fish.

7. The fish processing device according to claim 1, wherein the barrier includes a gate having a panel and an actuator.

8. The fish processing device according to claim 7, wherein the panel is moveable from an open position to a closed position by the actuator, wherein the open and closed positions of the panel correspond with the open and closed positions of the barrier, respectively.

9. The fish processing device according to claim 8, wherein the panel is pivotable about a point for moving the panel from the open position to the closed position, wherein when the panel is in the closed position the fish is prevented from passing through the channel thus deterring the fish.

10. The fish processing device according to claim 1, wherein the barrier includes a jet of air to deter the fish.

11. The fish processing device according to claim 1, wherein the barrier includes a light source to deter the fish.

12. The fish processing device according to claim 1, wherein the control system further includes an alarm to alert an operator if the fish is in the second orientation in the channel.

\* \* \* \* \*